(12) United States Patent
Kinoshita et al.

(10) Patent No.: US 8,640,803 B2
(45) Date of Patent: Feb. 4, 2014

(54) HYDRAULIC EXCAVATOR

(75) Inventors: Nobufumi Kinoshita, Hirakata (JP); Osamu Takano, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/809,497

(22) PCT Filed: May 24, 2012

(86) PCT No.: PCT/JP2012/063252
§ 371 (c)(1),
(2), (4) Date: Jan. 10, 2013

(87) PCT Pub. No.: WO2012/172949
PCT Pub. Date: Dec. 20, 2012

(65) Prior Publication Data
US 2013/0115037 A1    May 9, 2013

(30) Foreign Application Priority Data

Jun. 17, 2011    (JP) .................................. 2011-135231

(51) Int. Cl.
*B60K 11/08*    (2006.01)

(52) U.S. Cl.
USPC ........................................ 180/68.1; 180/68.4

(58) Field of Classification Search
USPC ............................................. 180/68.1, 68.2
See application file for complete search history.

(56) References Cited

U.S. PATENT DOCUMENTS

| | | | |
|---|---|---|---|
| 3,788,418 A | 1/1974 | Clancy et al. | |
| 5,671,820 A * | 9/1997 | Kobayashi et al. | 180/68.1 |
| 5,791,301 A * | 8/1998 | Watanabe | 123/41.31 |
| 6,223,845 B1 * | 5/2001 | Miyachi et al. | 180/68.3 |
| 6,296,436 B1 * | 10/2001 | Ramun | 414/719 |
| 6,427,798 B1 * | 8/2002 | Imashige | 180/309 |
| 6,540,036 B1 * | 4/2003 | Sugano | 180/68.1 |
| 6,601,324 B2 * | 8/2003 | Iwasa et al. | 37/347 |
| 6,678,972 B2 * | 1/2004 | Naruse et al. | 37/466 |
| 6,745,860 B2 * | 6/2004 | Yabe | 180/68.1 |

(Continued)

FOREIGN PATENT DOCUMENTS

| | | |
|---|---|---|
| JP | 2002-30693 A | 1/2002 |
| JP | 2003-3519 A | 1/2003 |
| JP | 2003-129847 A | 5/2003 |
| JP | 2004-270268 A | 9/2004 |

OTHER PUBLICATIONS

German Notice of Allowance issue on Jul. 24, 2013.

*Primary Examiner* — Jeffrey J Restifo

(74) *Attorney, Agent, or Firm* — Global IP Counselors, LLP

(57) ABSTRACT

A hydraulic excavator includes a lower travel body, an upper swivel body, a cooling unit, and first and second exterior members. The cooling unit includes a first cooling device disposed facing the first exterior member, and a second cooling device disposed on a side of the first cooling device towards the second exterior member and in midway in an air channel between the second exterior device and a cooling fan. The second cooling device extends in a direction intersecting a direction in which the first cooling device extends. The first and second exterior members have first and second openings in portions that overlap the first and second cooling devices in a height direction, respectively. A lower edge of one of the first opening and the second opening disposed at a higher position is positioned higher than an upper edge of the other of the first opening and the second opening.

7 Claims, 7 Drawing Sheets

(56) References Cited

U.S. PATENT DOCUMENTS

| | | | |
|---|---|---|---|
| 6,922,925 B2* | 8/2005 | Watanabe et al. | 37/466 |
| 7,134,518 B2* | 11/2006 | Arai et al. | 180/68.1 |
| 7,134,519 B2* | 11/2006 | Imashige | 180/69.24 |
| 7,388,301 B2* | 6/2008 | Komiyama et al. | 290/40 C |
| 7,451,843 B2* | 11/2008 | Nakashima et al. | 180/68.1 |
| 7,513,326 B2* | 4/2009 | Miyachi | 180/68.4 |
| 7,810,597 B2* | 10/2010 | Imashige | 180/69.2 |
| 7,828,097 B2* | 11/2010 | Kondou et al. | 180/68.1 |
| 7,841,314 B2* | 11/2010 | Nakashima et al. | 123/198 E |
| 7,874,390 B2* | 1/2011 | Taniuchi et al. | 180/68.4 |
| 7,900,996 B2* | 3/2011 | Kimura et al. | 296/190.09 |
| 8,006,991 B2* | 8/2011 | Taniuchi et al. | 280/164.1 |
| 8,037,963 B2* | 10/2011 | Nishimura et al. | 180/291 |
| 8,215,434 B2* | 7/2012 | Matsushita et al. | 180/68.4 |
| 8,365,855 B2* | 2/2013 | Mamada et al. | 180/68.1 |
| 8,397,851 B2* | 3/2013 | Ueda | 180/68.1 |
| 8,540,042 B2* | 9/2013 | Atarashi et al. | 180/68.1 |
| 2008/0223319 A1* | 9/2008 | Nakashima et al. | 123/41.66 |
| 2012/0285757 A1* | 11/2012 | Atarashi et al. | 180/68.1 |
| 2013/0115037 A1* | 5/2013 | Kinoshita et al. | 414/687 |
| 2013/0228388 A1* | 9/2013 | Ueda et al. | 180/68.1 |

* cited by examiner

HYDRAULIC EXCAVATOR

CROSS-REFERENCE TO RELATED APPLICATIONS

This application claims priority to Japanese Patent Application No. 2011-135231 filed on Jun. 17, 2011, the disclosure of which is hereby incorporated herein by reference in its entirety.

TECHNICAL FIELD

The present invention relates to a hydraulic excavator, and particularly to a structure for cooling a plurality of cooling devices provided to a hydraulic excavator.

BACKGROUND ART

Hydraulic excavators are equipped with a radiator for cooling engine coolant, an oil cooler for cooling hydraulic oil of hydraulic apparatuses, an aftercooler for cooling compressed air to be fed to the engine, and various other cooling devices.

This plurality of cooling devices is often disposed in a side surface of the vehicle body in the hydraulic excavator. For example, in the hydraulic excavator described in Japanese Laid-open Patent Application No. 2003-3519, cooling devices are disposed in the side surface of the vehicle body; a side door and engine hood are provided for covering the cooling devices; and, separately therefrom, a lid for covering the area above a screen is provided. An opening tier directing cooling air to the cooling devices is formed taking in outside air is formed in the side door or the like.

Japanese Laid-open Patent Application No. 2002-30693 describes that two air channels are provided from the side part to the rear part of a hydraulic excavator, a radiator is disposed in one of the air channels, and an oil cooler is disposed in the other air channel.

SUMMARY

The move toward hybrids in recent years is progressing in hydraulic excavators as well. In such hybrid hydraulic excavators, a radiator (herein referred to as "hybrid radiator") for cooling the inverter and other electromotor systems is required in addition to the plurality of conventional cooling devices. Therefore, cooling air must be efficiently fed to the plurality of cooling devices, and degradation in the heat balance must be prevented.

In view of the above, it is possible to consider providing two air channels and disposing a plurality of cooling devices in the air channels, as described in Japanese Laid-open Patent Application No. 2002-30693.

However, in the configuration described in the above mentioned publication, it is possible that essentially all air is taken into the air channel through which air is readily taken in, and air is essentially not taken in from the other air channel.

Since three or more cooling devices are required in a hydraulic excavator, a plurality of cooling devices must be doubly disposed in a single air channel. In the case that the cooling structure disclosed in the above mentioned publication is applied in such a situation, streams of air that pass through the cooling devices disposed in two air channels interfere with each other, and cases may arise in which air cannot be fed with good efficiency to the cooling device on the downstream side of the air channel among the plurality of cooling devices doubly disposed in the channels.

An object of the present invention is to make it possible to feed air with good efficiency to the plurality of cooling devices provided to a hydraulic excavator.

The hydraulic excavator according to a first aspect comprises a lower travel body, an upper swivel body, a cooling unit, and a first exterior member and a second exterior member. The upper swivel body has a drive source, a work implement, and a cooling fan, and is swivelably supported on the lower travel body. The cooling unit disposed midway in an air channel formed by the cooling fan. The first exterior member and the second exterior member cover the cooling unit, are disposed in the front-rear direction of the vehicle body, and are supported by the upper swivel body. The cooling unit includes a first cooling device and a second cooling device. The first cooling device is disposed facing the first exterior member. The second cooling device is disposed midway in an air channel between the second exterior device and the cooling fan, in a direction intersecting the direction in which the first cooling device is disposed to a side of the first cooling device towards the second exterior member. The first exterior member has a first opening in a portion that overlaps the first cooling device in the height direction, and the second exterior member has a second opening in a portion that overlaps the second cooling device in the height direction. The lower edge of the higher disposed opening, among the first opening of the first exterior member and the second opening of the second exterior member, is positioned higher than the upper edge of the lower disposed other opening.

According to the aspect described above, the cooling fan is driven, whereby air is taken into the interior via the first opening of the first exterior member, and the air passes through the first cooling device. The coolant inside the first cooling device is thereby cooled. Similarly, air is taken into the interior via the second opening of the second exterior member, and the air thus taken in passes through the second cooling device, whereby the coolant in the second cooling device is cooled.

According to the aspect described above, space can be effectively used and a plurality of cooling devices can be disposed because the second cooling device is disposed in a direction orthogonal to the first cooling device and to the side of the first cooling device. Also, air can be fed with good efficiency to the cooling devices because the air taken in via separate openings is fed to the first cooling device and the second cooling device. Accordingly, degradation in the heat balance can be avoided.

It is possible to minimize a drawback in which a large amount of air is taken into from one opening and a small amount of air is taken in from the other opening, because the first opening and the second opening are provided in different position in the height direction. Also, the streams of air taken in from the two openings can be inhibited from interfering with each other and air can be fed with good efficiency to the cooling devices.

The hydraulic excavator according to a second aspect is the hydraulic excavator according to the first aspect, wherein the first cooling device is disposed so that an air-inflow surface faces the first opening of the first exterior member. The second cooling device is disposed so that an air-inflow surface is virtually orthogonal to the second opening of the second exterior member.

According to the aspect described above, air taken in from the first opening is fed with good efficiency to the first cooling device. Also, the second cooling device is disposed so that the air inflow surface is virtually orthogonal to the second opening. Therefore, the first opening and the second opening are provided so as to be positioned differently in the height direction and streams of air taken in from the two openings can accordingly be inhibited from interfering with each other.

The hydraulic excavator according to a third aspect is the hydraulic excavator according to the first or second aspect, further comprising a third cooling device disposed between the first cooling device and the cooling fan, and parallel to the first cooling device.

According to the aspect described above, air that passes through the first cooling device is fed to the third cooling device. Also, as described above, the streams of air taken in from the two openings can be inhibited from interfering with each other on the upstream side of the airflow channel of the third cooling device, and cooling air is therefore fed with good efficiency to the third cooling device.

The hydraulic excavator according to a fourth aspect is the hydraulic excavator according to any of the first through third aspects, wherein the first cooling device and the second cooling device are disposed in different position in the height direction. The second cooling device is disposed at an incline so that the upper part is positioned further forward than the lower part.

According to the aspect described above, the air that passes through the second cooling device is directed to the opposite side from the first cooling device in the height direction. Accordingly, two cooling devices are disposed in different position in the height direction, and streams of air taken into the interior can accordingly be inhibited from interfering with each other. For this reason, air can be fed to another cooling device with good efficiency even when the other cooling device is disposed so as to overlap the first cooling device.

The hydraulic excavator according to a fifth aspect is the hydraulic excavator according to any of the first through fourth aspects, wherein the upper swivel body includes a first vertical frame disposed in the vertical direction at the vehicle side, a second vertical frame disposed to the vehicle forward side of the first vertical frame, and a third vertical frame disposed to the vehicle forward side of the second vertical frame. The first exterior member is disposed between the first vertical frame and the second vertical frame, and the second exterior member is disposed between the second vertical frame and the third vertical frame. The second cooling device has one side part supported by the second vertical frame.

According to the aspect described above, the second exterior member is disposed adjacent to the second cooling device. Therefore, air taken in from the second opening of the second exterior member is fed with good efficiency to the second cooling device.

The hydraulic excavator according to a sixth aspect is the hydraulic excavator according to the fifth aspect, further comprising an air cleaner coupled to the drive source and disposed in the internal space covered by the second exterior member between the second vertical frame and the third vertical frame. The air from the second opening of the second exterior member is taken into the air cleaner.

According to the aspect described above, of the air taken in via the second opening, air other than the air taken into the air cleaner can be fed with good efficiency to the second cooling device.

The hydraulic excavator according to a seventh aspect is the hydraulic excavator according to any of the first through sixth aspects, wherein the first cooling device is a hybrid radiator for cooling electrical equipment; and the second cooling device is a condenser for an air conditioner.

In the present invention as described above, a plurality of cooling devices can be cooled with good efficiency in a hydraulic excavator. In particular, the present invention is effectively applied to a hybrid hydraulic excavator in which numerous cooling devices are required.

BRIEF DESCRIPTION OF TUE DRAWINGS

DETAILED DESCRIPTION OF PREFERRED EMBODIMENTS

Overall Configuration

Figure 1:
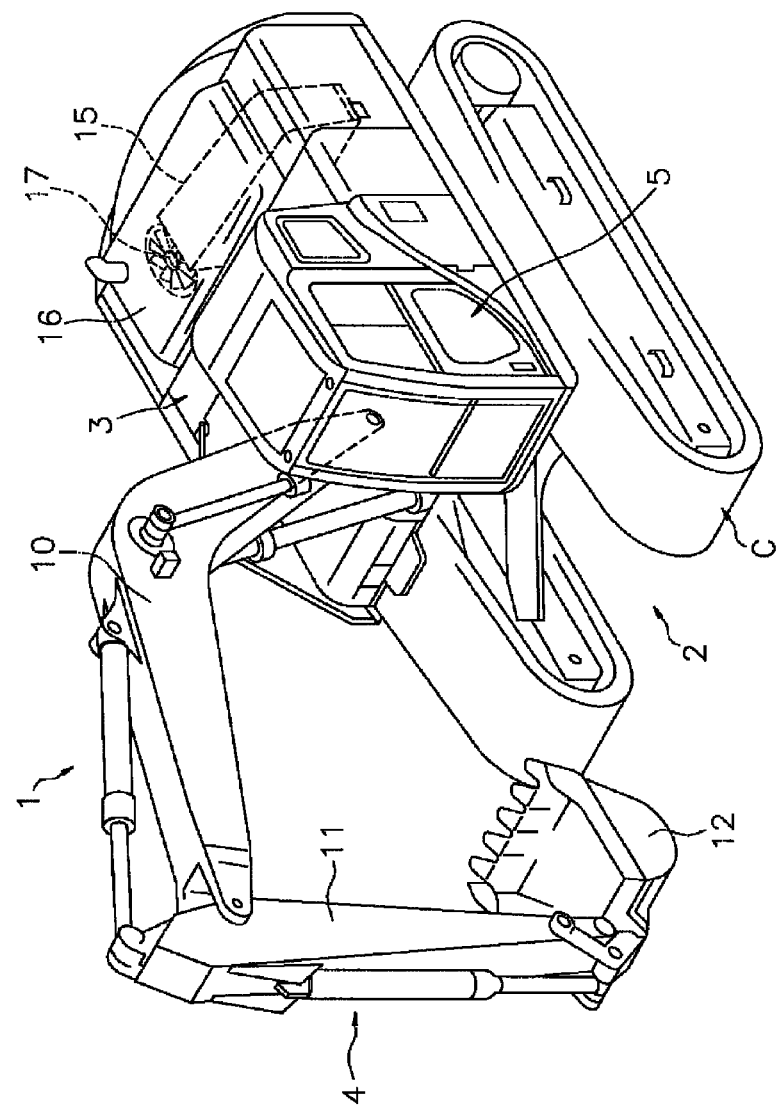
FIG. 1 is a perspective view of the external appearance of a hybrid hydraulic excavator according to an embodiment of the present invention.

The hydraulic excavator 1 according to an embodiment of the present invention is shown in FIG. 1. The hydraulic excavator 1 is a hybrid hydraulic excavator, and is provided with a swivel electric motor, a power generation motor, an inverter as a converter, a capacitor for storing an electric charge, a diesel engine, and the like. In this hybrid hydraulic excavator 1, energy generated when swiveling of the vehicle body decelerates is converted into electrical energy, and the electrical energy obtained together with the energy of the power generation motor directly connected to the engine is stored in the capacitor. The stored electrical energy is used as auxiliary energy during engine acceleration by way of the power generation motor. Hereinbelow, the terms "front," "rear," "left," and "right" are directions determined by reference to an operator seated in the driver's seat.

The hydraulic excavator 1 shown in FIG. 1 is provided with a lower travel body 2, an upper swivel body 3, a work implement 4, and a cab 5.

The lower travel body 2 has a pair of crawler belts C on the left and right sides, and travel is made possible by driving the crawler belts C. The upper swivel body 3 is swivelably supported by the lower travel body 2, and swiveling in an arbitrary direction is made possible by a swivel electric motor (not shown). The work implement 4 and the cab 5 are equipped on the upper swivel body 3. The work implement 4 has a boom 10, an arm 11, and a bucket 12. The work implement 4 has a plurality of hydraulic cylinders for driving the constituent members 10 to 12.

Also, an engine 15 is disposed in a transverse arrangement in the rear part of the upper swivel body 3. In other words, a crankshaft (not shown) of the engine 15 is disposed so as to be substantially orthogonal to the front-rear direction of the hydraulic excavator 1. The engine 15 is covered by an engine cover and/or an exterior cover 16 arranged above the engine cover. A cooling fan 17 rotated by the engine 15 is provided to the distal end part (right end part) of the engine 15.

Cooling Unit and Exterior Door

Figure 2:
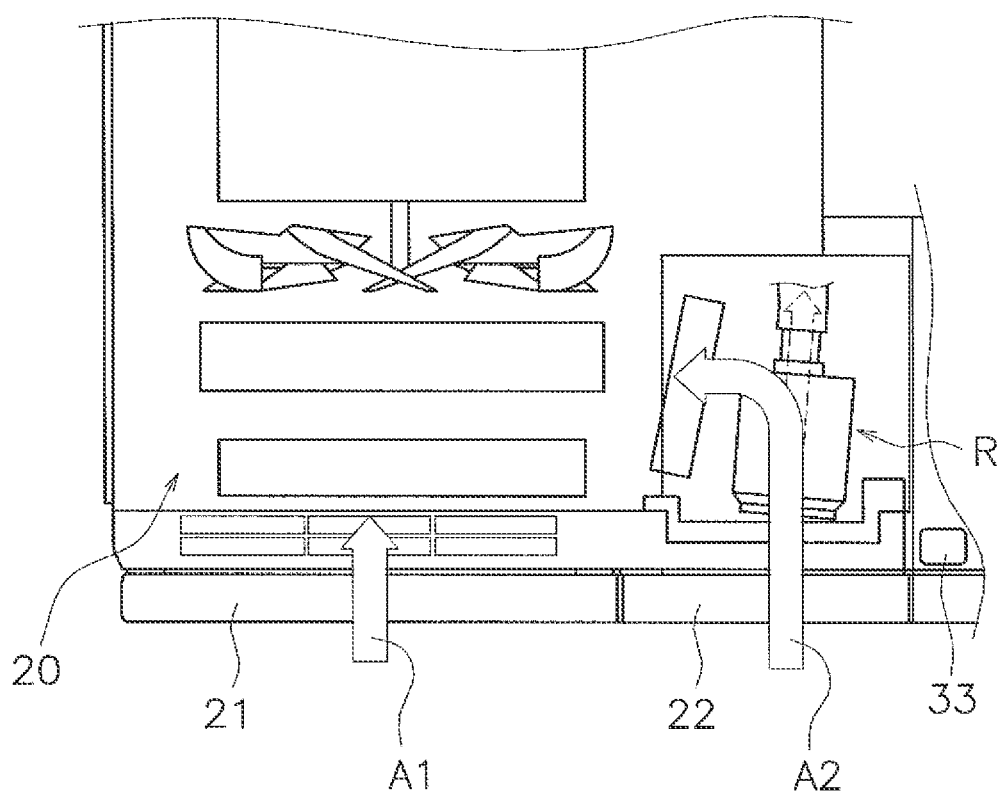
FIG. 2 is a plan view showing two air channels.
Figure 3:
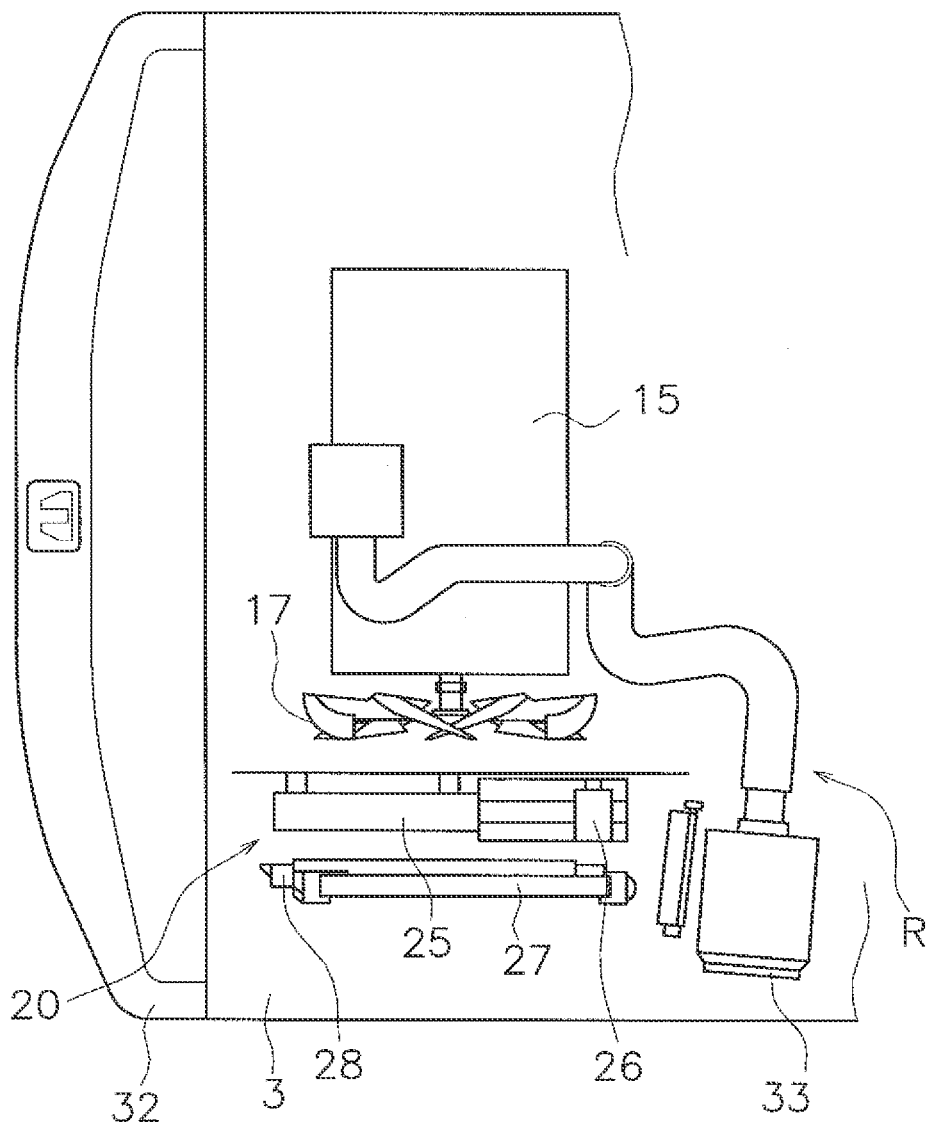
FIG. 3 is a plan view showing the arrangement of the cooling unit and the cooling fan.
Figure 4:
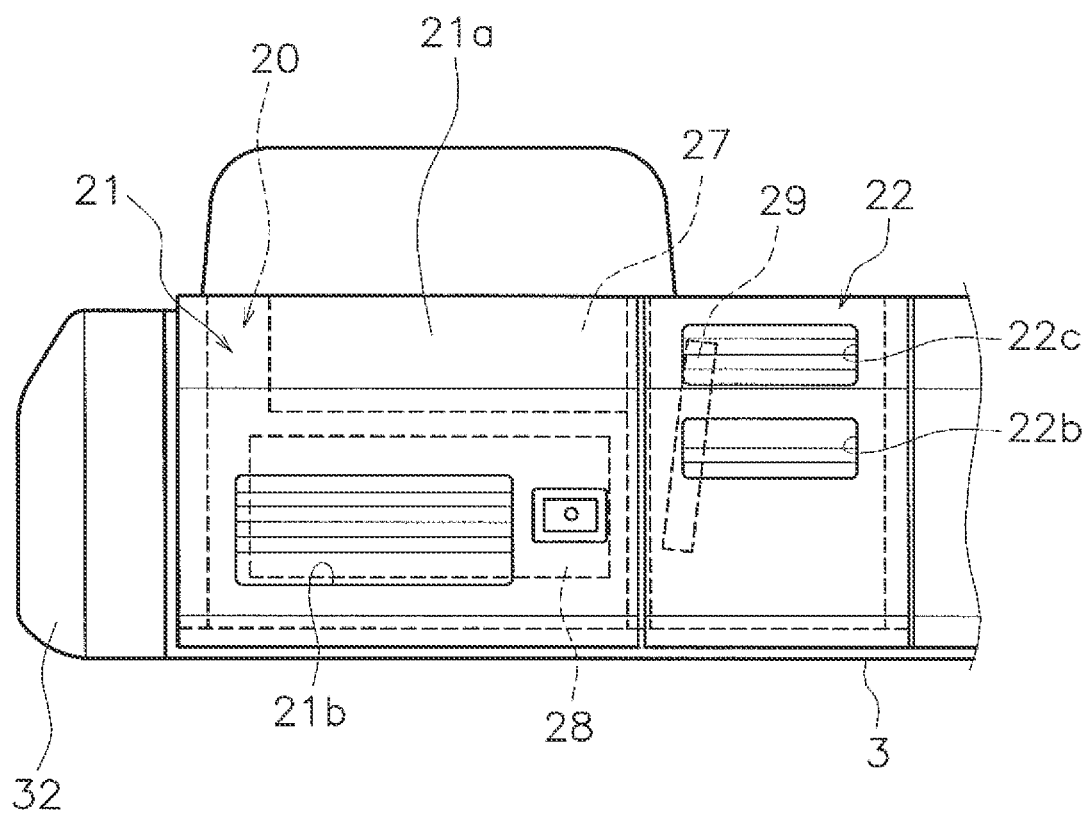
FIG. 4 is a rear right side view of the hydraulic excavator.

A cooling unit 20 is disposed on the right side end in the rear part of the upper swivel body 3, as shown in FIGS. 2 to 4. The cooling unit 20 is composed of a plurality of cooling devices as described in detail below. The rearward exterior door 21 and the forward exterior door 22 as exterior components are disposed in a line in the front-rear direction so as to cover the cooling unit 20. FIGS. 2 and 3 are plan views of the cooling unit 20 as seen from above with the exterior covers removed. FIG. 4 is a right side surface view of the rear part of the hydraulic excavator 1. In FIG. 3, only the configuration related to the cooling unit 20 is shown, and other constituent components are omitted. In FIG. 2, the cooling devices of the cooling unit 20 are schematically shown.

Figure 5:
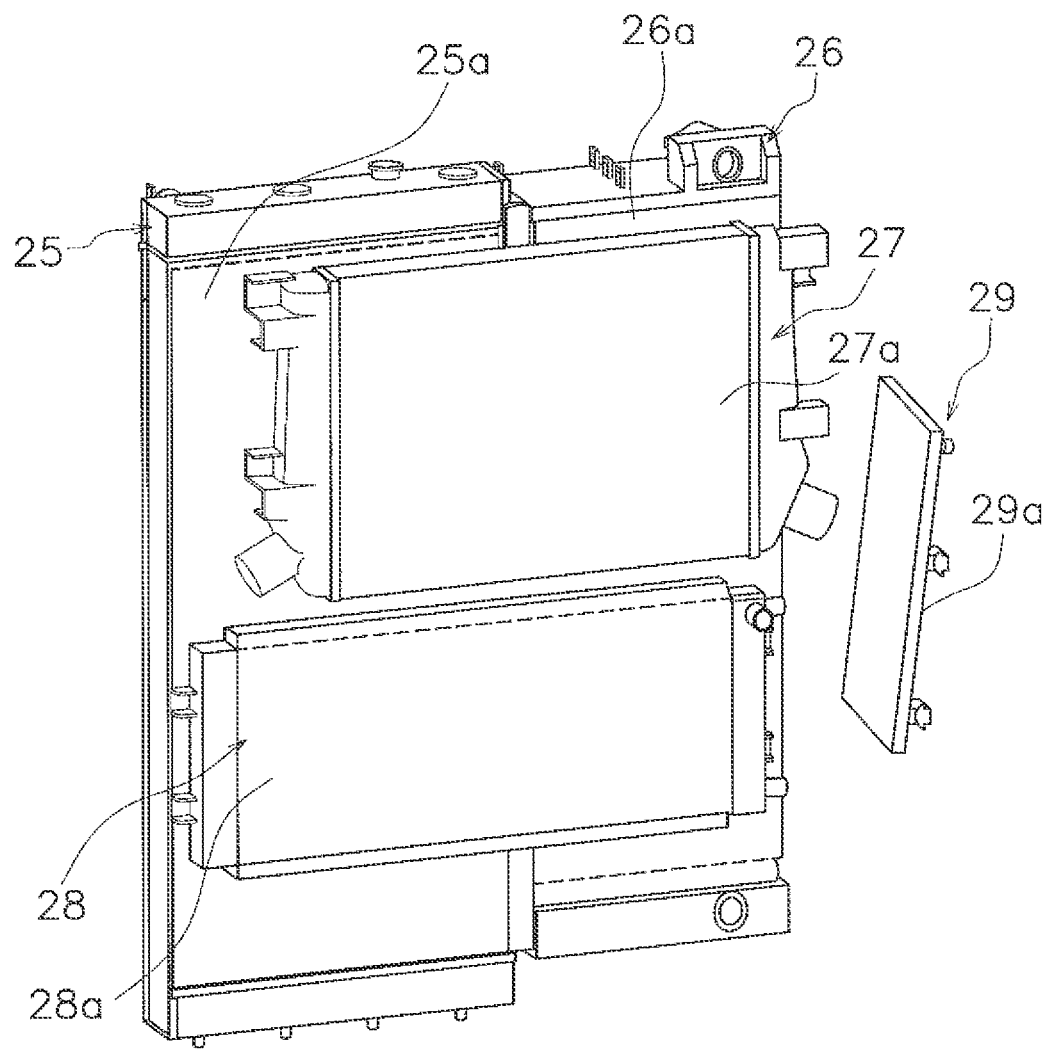
FIG. 5 is a layout view of the plurality of cooling devices constituting the cooling unit.

The cooling unit 20 is disposed on the upstream side of the airflow channel formed by the cooling fan 17, i.e., between the cooling fan 17, and the rearward exterior door 21 and forward exterior door 22. It is apparent in FIG. 5 that the cooling unit 20 has a radiator 25 for cooling engine coolant, an oil cooler 26 for cooling lubricating oil, an aftercooler 27 for cooling compress air to be fed to the engine, a hybrid radiator 28 for cooling an inverter and other electromotor systems, and a condenser 29 of an air conditioning device.

The radiator 25 and the oil cooler 26 are disposed facing the rearward exterior door 21 and linearly disposed in the front-rear direction of the vehicle. More specifically, the radiator 25 and the oil cooler 26 are both of an oblong and rectangular shape as viewed from the side of the vehicle, and are disposed so that air inflow surfaces 25a, 26a are substantially parallel to the main surface 21a (see FIG. 4) of the rearward exterior door 21. The air inflow surfaces 25a, 26a of the radiator 25 and the oil cooler 26 are positioned substantially in the same plane.

The aftercooler 27 is disposed on the opposite side of the cooling fan 17 with the radiator 25 and the oil cooler 26 disposed therebetween. The aftercooler 27 is disposed so as to overlap about half the area above the radiator 25 and the oil cooler 26 in the height direction as viewed from the side of the vehicle. The air inflow surface 27a of the aftercooler 27 is parallel to the air inflow surfaces 25a, 26a of the radiator 25 and the oil cooler 26.

The hybrid radiator 28 is disposed below the aftercooler 27 on the same side as the aftercooler 27. The hybrid radiator 28 is disposed so as to overlap the area of the lower portion of the radiator 25 and the oil cooler 26 in the height direction as viewed from the side of the vehicle. The hybrid radiator 28 is disposed so as to overlap the aftercooler 27 in a plan view. The air inflow surface 28a of the hybrid radiator 28 is parallel to the air inflow surfaces 25a, 26a of the radiator 25 and the oil cooler 26 in the same manner as the aftercooler 27.

Figure 6:
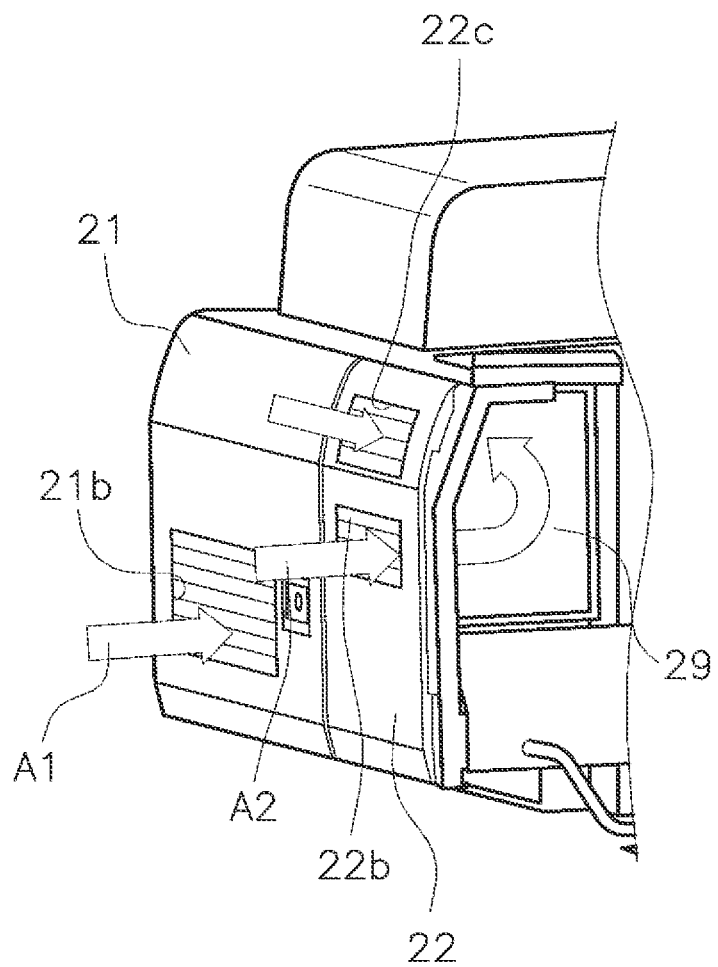
FIG. 6 is a partial perspective view of the external appearance of the hydraulic excavator showing two air channels.

The condenser 29 is disposed to the side of the radiator 25, the oil cooler 26, the aftercooler 27, and the hybrid radiator 28, i.e., on the forward side of these components. The condenser 29 is of an oblong, rectangular shape as viewed from the front of the vehicle, and is disposed so as to be substantially orthogonal to the other cooling devices. More specifically the air inflow surface 29a of the condenser 29 is substantially orthogonal to the air inflow surfaces 25a, 26a, 27a, 28a of the radiator 25 and other cooling devices. The condenser 29 is disposed at an incline so that the upper part is positioned further forward than the lower part The rearward exterior door 21 is disposed forward of a counterweight 32 in the rear end of the vehicle. A rear opening 21b having a predetermined width in the height direction is formed below the center part in the height direction in the rearward exterior door 21, as shown in FIGS. 4 and 6. A louver is provided in order to inhibit the entry of dust and other foreign matter into the rear opening 21b and to determine the direction of airflow. The rear opening 21b is formed in a position facing the hybrid radiator 28. Therefore, substantially the entire rear opening 21b overlaps the hybrid radiator 28 as viewed from the side of the vehicle.

The forward exterior door 22 is disposed in a line forward of the rearward exterior door 21. A lower front opening 22b and an upper front opening 22c of predetermined width are formed above the center part of the forward exterior door 22 in the height direction. The front openings 22b, 22c are disposed so as to not overlap the rear opening 21b in the height direction. More specifically, the lower edge of the lower front opening 22b, which is formed lower among the front openings 22b, 22c, is positioned higher than the upper edge of the rear opening 21b. A louver is provided in order to inhibit the entry of dust and other foreign matter into the two front openings 22b, 22c and to determine the direction of airflow. Also, substantially the entire two front openings 22b, 22c overlap the condenser 29 in the height direction.

A space R partitioned by a portion of the vehicle body frame constituting the upper swivel body 3 and by other constituent members is formed in the interior of the forward exterior door 22, as shown in FIGS. 2 and 3. An air cleaner 33 coupled to the engine 15 via piping is disposed in the space R.

Two airflow channels A1, A2, as shown in FIGS. 2 and 6, are termed by the cooling fan 17 and the openings 21b, 22b, 22c of the exterior doors 21, 22 as described above. The first airflow channel A1 passes through the hybrid radiator 28 from the rear opening 21b of the rearward exterior door 21, and then passes through about half the area below the radiator 25 and the oil cooler 26 and reaches the cooling fan 17. The second airflow A2 passes through the condenser 29 via areas other than the air cleaner 33 from the two front openings 22b, 22c of the forward exterior door 22, and then passes through about half the area above the radiator 25 and the oil cooler 26 and reaches the cooling fan 17.

Exterior Door and Condenser Installation Structure

Figure 7:
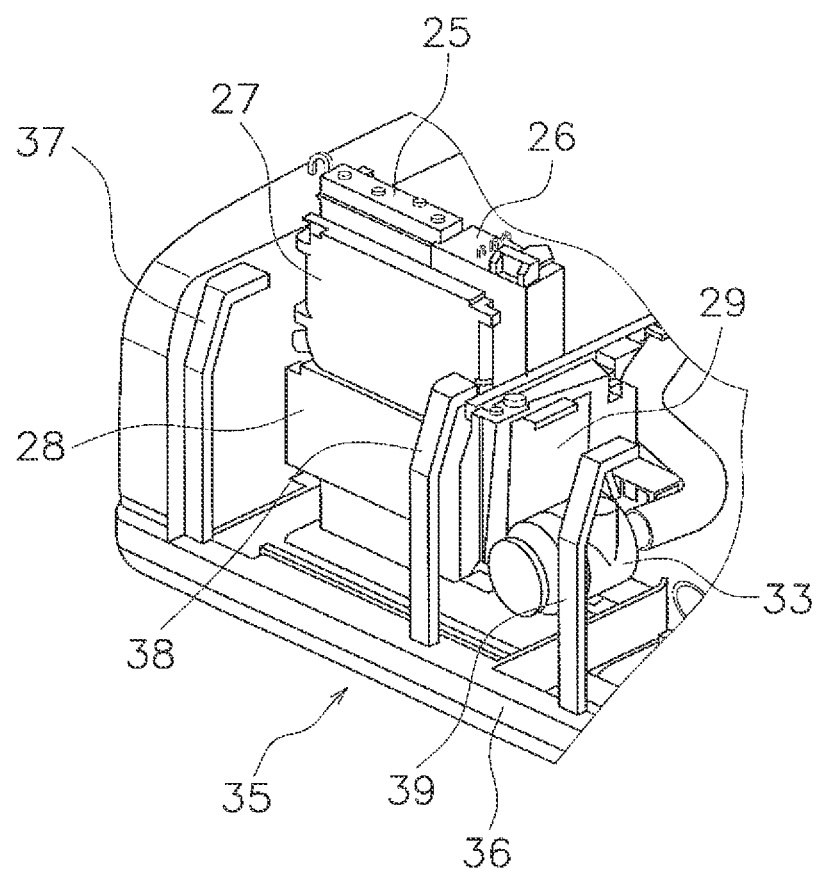
FIG. 7 is a partial perspective view of the external appearance showing the positional relationship between the cooling unit and the frames of the upper swivel body.

A swivel frame 35 constituting the upper swivel body 3 has a base frame 36, and first to third vertical frames 37, 38, 39 extending upward from the base frame 36, as shown in FIG. 7. The lower ends of the three vertical frames 37, 38, 39 are secured to the base frame 36.

The rearward exterior door 21 is supported by the first vertical frame 37 disposed most rearward, and the forward exterior door 22 is supported by the third vertical frame 39 disposed most forward. More specifically; the rearward side part of the rearward exterior door 21 is openably/closably installed on the first vertical frame 37 via hinges. A hook (not shown) provided to the forward side part of the rearward exterior door 21 can be latched onto a latch part provided to the second vertical frame 38. The forward side part of the forward exterior door 22 is openably/closably installed on the third vertical frame 39 via hinges. A hook (not shown) provided to the rearward side part of the forward exterior door 22 can be latched onto a latch part provided to the second vertical frame 38

Also, the right side part of the condenser 29 is secured to the inner side of the second vertical frame 38.

Airflow

Air from the exterior of the vehicle is taken into the interior of the vehicle by the rotation of the cooling fan 17 via the openings 21b, 22b, 22c in the rearward exterior door 21 and forward exterior door 22, respectively.

Air that has passed through the rear opening 21b of the rearward exterior door 21 is taken into the interior of the vehicle, as shown by the arrow A1 in FIGS. 2 and 6. The coolant of the hybrid radiator 28 is mainly cooled by the air that flows through the first airflow channel A1. The coolant flowing through substantially the lower half of the radiator 25 and the oil cooler 26 is cooled by the air that flows through the hybrid radiator 28.

On the other hand, a portion of the air that has passed through the upper and lower front openings 22b, 22c of the forward exterior door 22 is taken into the air cleaner 33, as shown by arrow A2 in FIGS. 2 and 6, and the remainder of the air is fed to the condenser 29. The coolant in the condenser 29 is first cooled by the air flowing through the second airflow A2. Air that has passed through the condenser 29 flows rearward and diagonally upward to the aftercooler 27 side because the condenser 29 is disposed at an incline. The coolant in the aftercooler 27 is cooled by this air. Similarly, the coolant flowing in substantially the upper half of the radiator 25 and the oil cooler 26 is cooled by air that has passed through the condenser 29 and air that has passed through the aftercooler 27.

In this case, the rear opening 21b and the upper and lower front openings 22b, 22c are formed in positions that do not overlap in the height direction, and air that flows through the first airflow channel A1 and air that flows through the second airflow A2 are therefore unlikely to interfere with each other. Accordingly, it is possible to inhibit a relative reduction in the amount of air that flows through the condenser 29. Air flows smoothly through the aftercooler 27, the radiator 25, and the oil cooler 26, and cooling can be carried out with good efficiency.

(1) Air taken in from the rear opening 21b of the rearward exterior door 21 passes through the hybrid radiator 28 and thereafter flows so as to pass through the lower half of the radiator 25 and the oil cooler 26. Air taken in from the forward exterior door 22 and the upper and lower front openings 22b, 22c passes through the condenser 29 and the aftercooler 27, and flows so as to pass through the upper half of the radiator 25 and the oil cooler 26. In other words, air taken in from the openings 21b, 22b, 22c of the rearward exterior door 21 and the forward exterior door 22, respectively, cool different cooling devices or different areas of the same cooling device without mutual interfere. Accordingly, the coolant of each cooling device is cooled with good efficiency.

In particular, the rear opening 21b and the upper and lower front openings 22b, 22c are disposed so as to not overlap in the height direction, and interference among air taken in from the openings 21b, 22b, 22c can therefore be further reduced.

(2) Substantially the entire rear opening 21b is disposed so as to overlap the hybrid radiator 28 in the height direction, and the entirety of the upper and lower front openings 22b, 22c is disposed so as to overlap the condenser 29 in the height direction. Accordingly, air can be directed to the hybrid radiator 28 and the condenser 29 with good efficiency.

(3) The upper part of the condenser 29 is disposed so as to be positioned further forward than the lower part, and air that has passed through the condenser 29 is directed diagonally upward to the rear. Accordingly, air that has passed through the condenser 29 is directed to the aftercooler 27 with good efficiency. Also, air that has passed through the condenser 29 and air that has passed through the hybrid radiator 28 can be further inhibited from interfering with each other.

(4) The condenser 29 is supported by one of the two vertical frames 38, 39 that sandwich the forward exterior door 22. Accordingly, the condenser 29 can be disposed adjacent to the openings 22b, 22c fanned in the forward exterior door 22, and air is fed with good efficiency to the condenser 29.

(5) A space is formed inside the forward exterior door 22, the condenser 29 and the air cleaner 33 are disposed in this interior space. Accordingly, air other than the air taken into the air cleaner 33 can be reliably fed to the condenser 29.

Other Embodiments

The present invention is not limited to an embodiment such as that described above; various modifications and corrections can be made without departing from the scope of the invention.

(a) In the embodiment described above, the cooling unit is disposed to the right side of the vehicle, but the disposition of the cooling unit is not limited the embodiment described above.

(b) The positions of the rear opening and the forward opening are not limited to the embodiment described above. For example, the hybrid radiator may be disposed above, the condenser may be disposed below, the rear opening may be formed above, and the forward opening may be formed below.

(c) In the embodiment described above, an exterior door is described as an example of the exterior member, but the present invention can be similarly applied to other exterior members.

The hydraulic excavator of the illustrated embodiments is capable of cooling a plurality of cooling devices with good efficiency. In particular, the structure according to the illustrated embodiments is effectively applied to a hybrid hydraulic excavator in which numerous cooling devices are required.

The invention claimed is:

1. A hydraulic excavator comprising:
a lower travel body;
an upper swivel body having a drive source, a work implement, and a cooling fan, the upper swivel body being swivelably supported on the lower travel body;
a cooling unit disposed midway in an air channel formed by the cooling fan; and
a first exterior member and a second exterior member covering the cooling unit, the first and second exterior members being disposed in a front-rear direction of a vehicle body and supported by the upper swivel body,
the cooling unit including
a first cooling device disposed facing the first exterior member, and
a second cooling device disposed on a side of the first cooling device towards the second exterior member and in midway in the air channel between the second exterior device and the cooling fan, the second cooling device extending in a direction intersecting a direction in which the first cooling device extends is disposed to a side of the first cooling device extends,
the first exterior member having a first opening in a portion that overlaps the first cooling device in a height direction,
the second exterior member having a second opening in a portion that overlaps the second cooling device in the height direction, and
a lower edge of one of the first opening and the second opening that is disposed at a higher position is positioned higher than an upper edge of the other of the first opening and the second opening that is disposed at a lower position.

2. The hydraulic excavator as recited in claim 1, wherein the first cooling device is disposed so that an air-inflow surface faces the first opening of the first exterior member; and the second cooling device is disposed so that an air-inflow surface is virtually orthogonal to the second opening of the second exterior member.

3. The hydraulic excavator as recited in claim 1, further comprising
a third cooling device disposed between the first cooling device and the cooling fan, and parallel to the first cooling device.

4. The hydraulic excavator as recited in claim 1, wherein
the first cooling device and the second cooling device are disposed in different positions in the height direction; and
the second cooling device is disposed at an incline so that an upper part is positioned further forward than a lower part.

5. The hydraulic excavator as recited in claim 1, wherein
the upper swivel body includes a first vertical frame disposed in a vertical direction at a vehicle side, a second vertical frame disposed to a vehicle forward side of the first vertical frame, and a third vertical frame disposed to the vehicle forward side of the second vertical frame,
the first exterior member is disposed between the first vertical frame and the second vertical frame,
the second exterior member is disposed between the second vertical frame and the third vertical frame, and
the second cooling device has one side part supported by the second vertical frame.

6. The hydraulic excavator as recited in claim 5, further comprising
an air cleaner coupled to the drive source and disposed in an internal space covered by the second exterior member between the second vertical frame and the third vertical frame,
air from the second opening of the second exterior member being taken into the air cleaner.

7. The hydraulic excavator as recited in claim 1, wherein
the first cooling device is a radiator configured to cool electrical equipment, and
the second cooling device is a condenser for an air conditioner.

* * * * *